Figure 7:
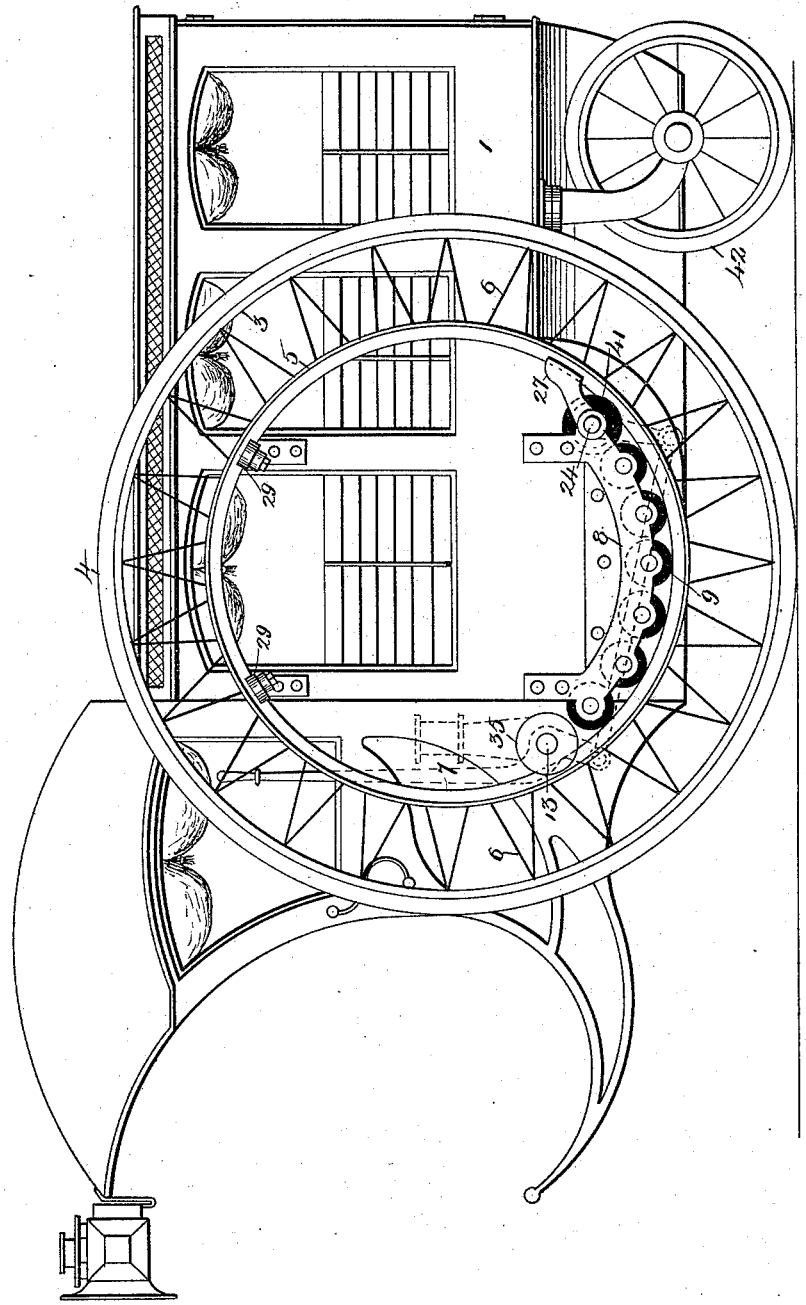

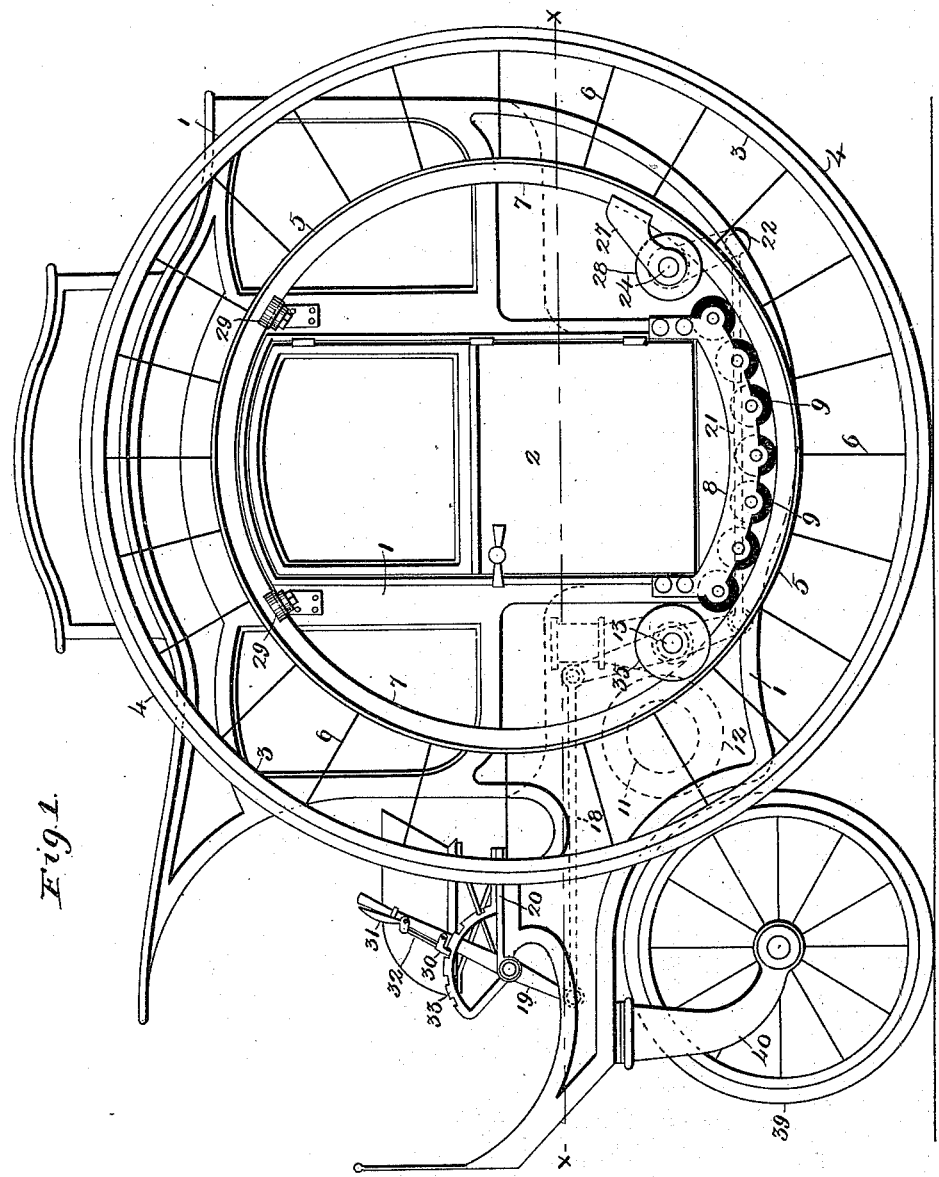

(No Model.) 3 Sheets—Sheet 2.
G. LANGER.
MOTOR VEHICLE.
No. 573,010. Patented Dec. 15, 1896.
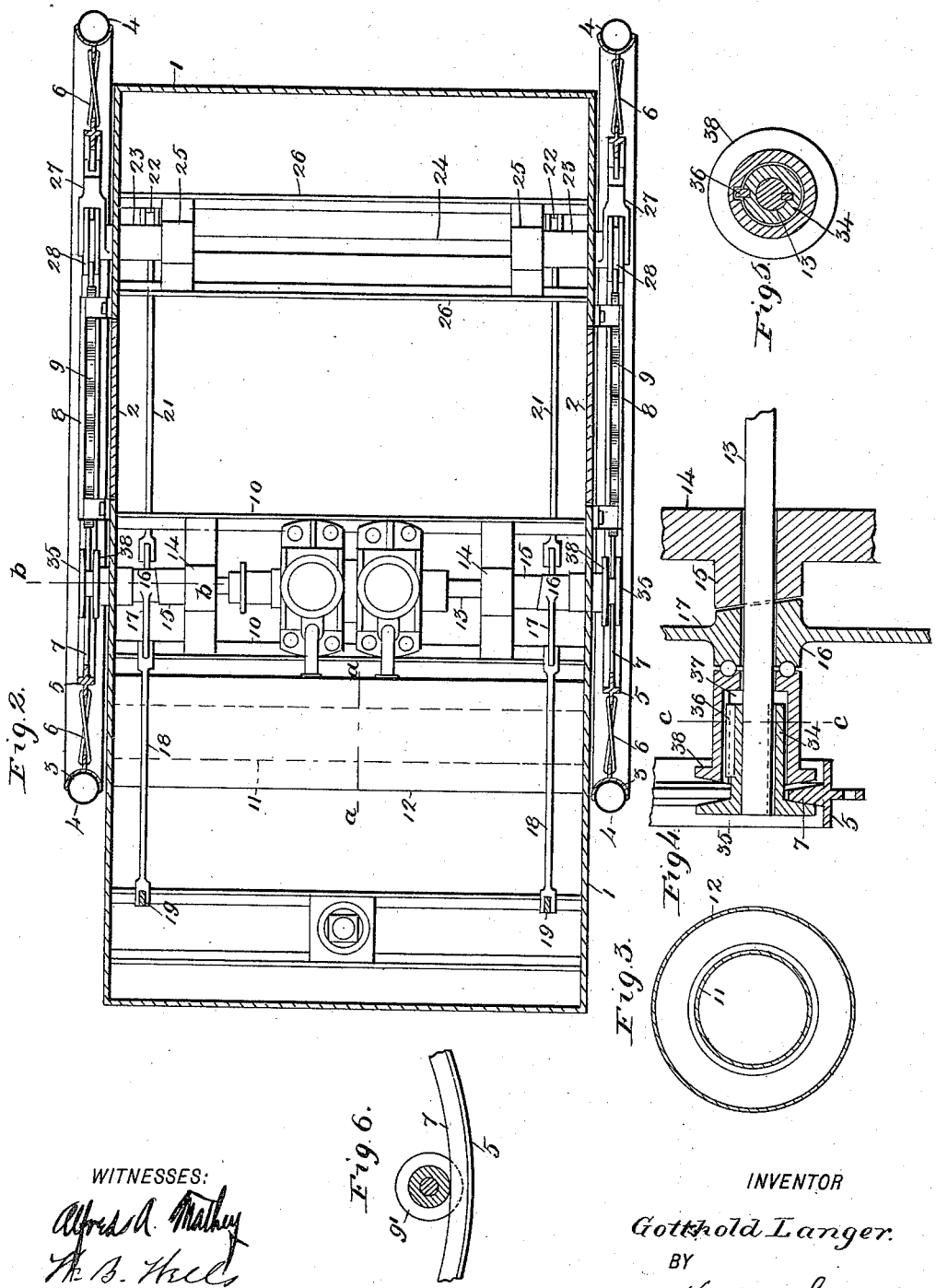
WITNESSES:
Alfred A. Mathey
H. B. Thiel
INVENTOR
Gotthold Langer.
BY
Keller & Starek
ATTORNEYS.

(No Model.) 3 Sheets—Sheet 3.

G. LANGER.
MOTOR VEHICLE.

No. 573,010. Patented Dec. 15, 1896.

WITNESSES:
Alfred A. Mathey
Th. B. Wells

INVENTOR
Gotthold Langer.
BY
Keller Staves
ATTORNEYS.

THE NORRIS PETERS CO., PHOTO-LITHO., WASHINGTON, D. C.

UNITED STATES PATENT OFFICE.

GOTTHOLD LANGER, OF ST. LOUIS, MISSOURI, ASSIGNOR OF ONE-HALF TO GEORGE W. RARER, OF SAME PLACE.

MOTOR-VEHICLE.

SPECIFICATION forming part of Letters Patent No. 573,010, dated December 15, 1896.

Application filed March 2, 1896. Serial No. 581,521. (No model.)

*To all whom it may concern:*

Be it known that I, GOTTHOLD LANGER, a citizen of the United States, residing at St. Louis, State of Missouri, have invented certain new and useful Improvements in Motor-Vehicles, of which the following is a full, clear, and exact description, reference being had to the accompanying drawings, forming a part hereof.

My invention has relation to improvements in horseless vehicles or motor-wagons; and it consists in the novel arrangement and combination of parts more fully set forth in the specification and pointed out in the claims.

In the drawings, Figure 1 is a side elevation of my invention. Fig. 2 is a horizontal section on the line $x\ x$ of Fig. 1. Fig. 3 is a section on $a\ a$ of Fig. 2, taken through the gasolene-cylinder of the engine and the water-jacket thereof. Fig. 4 is an enlarged section of one end of the drive-shaft, taken on the line $b\ b$ of Fig. 2. Fig. 5 is a transverse section on the line $c\ c$ of Fig. 4. Fig. 6 is a section of one of the modified forms of supporting-rollers for the carriage-body, and Fig. 7 is a side elevation of a modified form of vehicle.

The object of my invention is to construct a horseless vehicle or motor-wagon that may be impelled by any suitable motor, but preferably by a gasolene-engine; one which will be light, durable, and under perfect control of the operator; one which shall run with a minimum amount of friction; one in which the body of the carriage shall be supported directly by a hubless wheel disposed on each side of said body, whereby the carriage can be entered through the opening of said wheel; one where special steering apparatus is dispensed with, the steering being accomplished directly from the running-gear of the device, and one which presents further and other advantages to be presently more specifically referred to.

Referring to the drawings, 1 represents the body portion of the carriage provided with the side doors 2. The drive-wheels are of the pattern identified with unicycles, being formed of an outer rim 3, provided with a pneumatic tire 4, and an inner concentric band or rim 5, the latter being connected to the outer rim by the spokes 6. The inner band 5 is provided with an inwardly-projecting rib 7, having inclined lateral faces, the free edge of the rib being the narrowest portion thereof. The rib is disposed medially between the opposite edges or sides of the band 5, the purpose of said rib being fully set forth in the further description of the invention.

Carried on each side of the body portion of the carriage adjacent to the ribs 7 and conforming approximately to the curvature thereof are castings 8, serving as a means for the support of the series of rollers 9, the latter being adapted to be supported by and travel over the inner edge of the ribs 7. These rollers 9, however, may be grooved, as seen in Fig. 6 and represented by 9', where the bases of the grooves run on and are supported by the edges of the ribs.

Carried on suitable transverse supporting-bars 10, disposed below the body portion of the vehicle, is a double-cylinder gasolene-engine having a gasolene-supply tank 11 surrounded by a water-jacket 12, the engine belonging to any of the approved forms which will develop the necessary horse-power to operate the vehicle.

The drive-shaft 13 of the engine is disposed transversely to the body portion, the shaft passing through the bearings 14, which are also supported by the bars 10 and firmly secured thereto. The drive-shaft projects a suitable distance beyond the bearings 14 on each side of the vehicle, each bearing being provided with a tubular extension 15 on the side adjacent to the projecting end of the shaft and embracing the latter. The terminal surface or end of said tubular extension is inclined, said inclined end being adapted to coöperate with a similar inclined surface of the hub portion 16 of the rocking lever 17, the long arm of which is connected by a connecting-rod 18 with the lower or short arm of a brake-operating lever 19, pivoted at the forward portion of the body of the vehicle on each side of the driver's seat 20, and the short arm of the lever 17 is connected by a connecting-rod 21 to the outer end or base of an arm 22, projecting from or secured to a rocking sleeve 23, mounted loosely on a rear shaft 24, whose bearings 25 are supported on the transverse supporting-bars 26.

Forming a part of the sleeve 23 and extending in a direction opposite to that of the arm 22 is a forked brake-shoe 27, the free end of which is adapted to bear against the rib 7. Between the forks of said shoes and mounted loosely on the projecting ends of the shaft 24 are grooved rollers 28, adapted to run upon and embrace the ribs 7, the rollers thus keeping the drive-wheels close to the body of the vehicle 1. In addition the body portion has disposed thereon the antifriction-disks 29, adapted to bear and ride against the outer face of the ribs 7 on each side, thereby further locking the drive-wheels to the carriage-body. The long arm of each brake-operating lever 19 is provided with a pawl 30, adapted to be tripped by a bell-crank lever 31, carried by the lever 19, the short arm of the bell-crank lever being connected to the pawl by a connecting-rod 32. The pawl coöperates with a toothed quadrant 33, along which the lever 19 can be locked into any desirable position.

At each end of the drive-shaft 13 is rigidly keyed the tubular stem 34 of a terminal disk or flange 35, the inner surface of which revolves adjacent to the outer lateral face of the rib 7, the contacting surface of the disk being inclined to correspond to the inclined face of the rib. Feathered loosely to the stem 34 by a key 36 is a cup 37, the open end of which has formed integrally therewith a flange or disk 38, whose outer inclined or bevel face is adapted to bear against and be shifted toward the inner lateral inclined face of the rib 7, the rib being thus adapted to be gripped between the adjacent surfaces of the disks 35 and 38, the contact between each disk and its adjacent face of the bevel-rib being along a single line of contact, as in the case of bevel friction-gears. The base of the cup 37 is adapted to bear against the adjacent surface of the hub 16 of the rocking lever 17, suitable ball-bearings being interposed between the two surfaces.

For convenience I shall here denominate the disks 35 and 38 collectively as the "driving and gripping disk," the cup 37, with its terminal disk 38, constituting the "movable" section and the disk 35 constituting the relatively "stationary" section of the said driving and gripping disk. As the shaft 13 rotates it will rotate the driving and gripping disk with it, and it is apparent that if the brake-operating levers are tilted in a direction to swing the hub 16 and lever 17, carried by it, about the shaft 13, thus causing the inclined end of each hub to revolve about the adjacent inclined wall of the tubular extension 15 of the shaft-supporting bracket 14, the movable section of the driving and gripping disk will be shifted toward the stationary section (stationary, of course, only in the sense that it does not slide longitudinally, although always in position to revolve with the shaft 13) and against the inner lateral inclined face of the rib 7, the latter being thus firmly gripped between the two revolving sections of the driving and gripping disk, and with the rotation of the latter will be carried along, and thus rotation will be imparted to the driving-wheels, of which the ribs 7 form a part. It is to be observed that the amount or distance the movable section of the driving and gripping disk is shifted is very slight, it being exaggerated in the drawings for the sake of clearness, the actual distance being only that which will suffice to alternately grip and when the vehicle is at a standstill to release the rib and allow the shaft to revolve alone. At the same time that the levers 17 are tilted to cause the driving and gripping disk to impel the driving-wheels the brake lever or shoe 27 (by reason of the connections described) will release the rib 7, and vice versa. When the brake-operating levers 19 are tilted to the same degree and locked in position along their respective quadrants, they cause the driving and gripping disk on each end of the shaft 13 to impel their respective drive-wheels at the same velocity; but it is obvious that if the drive-wheel on one side is permitted to be impelled and the brake applied to the wheel on the opposite side of the vehicle the carriage will turn about the wheel that is locked and thus turn a corner when such occasion arises, the sharpness of the turn depending on the relative velocity of the wheels on opposite sides of the carriage. The vehicle therefore under the present construction is devoid of special steering apparatus, the steering being accomplished direct from the drive-shaft by causing one or the other of the drive-wheels to be locked against rotation.

The rollers 9 are generally constructed of hide or leather, although any equivalent material may be substituted. The front wheel 39 is mounted between the forked arms 40, whose base is pivotally secured to the bottom of the front end of the carriage.

In the modification shown in Fig. 7 I dispense with the roller 28, and in lieu thereof I groove the last roller 41 of the series of rollers that traverse the rib of the inner band or rim. In this modification, too, the small wheel 42 is placed in the rear instead of the front, by reason of the modified form of carriage-body, which in this case is intended for a delivery-wagon.

Having described my invention, what I claim is—

1. In a motor-vehicle, a suitable carriage-body, drive-wheels adapted to support said body, a motor, a drive-shaft for said motor, suitable gripping devices rotated by said shaft, and means under the control of the operator for varying the amount of grip on either wheel whereby the speed of each wheel and the direction of travel of the carriage is controlled, substantially as set forth.

2. In a motor-vehicle, a suitable carriage-body, a motor carried thereby, a drive-shaft for said motor, suitable drive-wheels, suitable driving mechanism interposed between the drive shaft and wheels, suitable brake mechanism for the drive-wheels, and means carried by the carriage-body for simultaneously controlling the driving and brake mechanism on each side of the carriage-body, the mechanism on one side being adapted to be controlled independently of that on the other side, substantially as set forth.

3. In a motor-vehicle, a suitable carriage-body, drive-wheels for the same, an outer and inner rim for each wheel, a rib carried by the inner rim, a motor, a drive-shaft for the motor, and means carried by the drive-shaft for gripping the rib of the inner rim of either or both wheels, during the revolution of said drive-shaft, substantially as set forth.

4. In a motor-vehicle, a suitable carriage-body, drive-wheels for the same, an outer and inner rim for each wheel, a bevel-rib forming a part of each inner rim, a suitable motor, a drive-shaft for the motor, a driving and gripping disk carried at each end of the drive-shaft, said driving and gripping disk comprising a relatively stationary section and a movable section, the movable section being adapted to be shifted toward the stationary section whereby the rib is gripped and impelled with the rotation of the two sections, substantially as set forth.

5. In a motor-vehicle, a suitable carriage-body, drive-wheels for the same, an outer and inner rim for each wheel, a bevel-rib carried by the inner rim of each wheel, a motor, a drive-shaft for the motor, suitable bearings for the shaft, a tubular portion forming a part of each bearing and embracing the shaft, an inclined end for said tubular portion, a hub having a lever-arm loosely mounted on the shaft adjacent to the tubular portion of the bearing and having an inclined end coöperating with the inclined end of the tubular portion of the bearing, a stationary rotating disk carried by the free end of the shaft, said terminal disk having an inclined or bevel face adapted to coöperate with one of the inclined faces of the rib, a cup slidingly feathered about the shaft and having a terminal disk adapted to be shifted toward the opposite inclined face of the rib, said second or movable disk also having an inclined face adapted to coöperate with the inclined adjacent face of the rib, ball-bearings interposed between the rotatable hub and the base of the cup, and suitable devices for oscillating the lever-arm of the hub whereby the movable or sliding cup and the disk carried thereby may be shifted toward the relatively stationary disk and toward the rib, and whereby the rib may be firmly gripped between the two disks and impelled during the rotation of the drive-shaft carrying the disks, substantially as set forth.

6. In a motor-vehicle, a suitable wheel, an outer and inner rim for the same, a bevel-rib forming a part of the inner rim, and means for gripping said rib and impelling the wheel, substantially as set forth.

7. In a motor-vehicle, a suitable carriage-body, a motor for the same, a drive-shaft for said motor, drive-wheels, an outer and inner rim for each wheel, a rib forming part of the inner rim, suitable rollers carried by the carriage-body and adapted to rest and travel over the rib, a driving and gripping disk carried at each end of the drive-shaft and adapted to embrace the rib, a rear shaft carried by the carriage-body, a grooved roller at each end of the shaft also adapted to embrace the rib of the inner rim, additional rollers carried by the carriage-body and adapted to bear against the outer face of the rib, a brake shoe or lever adapted to rock about the rear shaft, a rocking lever carried at each end of the drive-shaft and adapted to control the driving and gripping disks, a brake-operating lever pivoted to the carriage and adapted to be locked into position, and suitable connections between the said brake-operating lever, and the rocking lever carried by the drive-shaft, and the brake-lever carried by the rear shaft for simultaneously controlling the driving and gripping disks and the brake lever and shoe forming a part thereof, substantially as set forth.

In testimony whereof I affix my signature in presence of two witnesses.

GOTTHOLD LANGER.

Witnesses:
ALFRED A. MATHEY,
EMIL STAREK.